(12) United States Patent
Noh et al.

(10) Patent No.: US 7,603,956 B2
(45) Date of Patent: Oct. 20, 2009

(54) DIRECT SEEDER

(75) Inventors: Oh-Seob Noh, Gwanggu (KR); Kwang-Ho Park, Gyeonggi-do (KR)

(73) Assignee: Korea: Rural Development Administration, Gyeonggi-do (KR)

( * ) Notice: Subject to any disclaimer, the term of this patent is extended or adjusted under 35 U.S.C. 154(b) by 0 days.

(21) Appl. No.: 12/067,435

(22) PCT Filed: Feb. 6, 2006

(86) PCT No.: PCT/KR2006/000421

§ 371 (c)(1),
(2), (4) Date: Mar. 19, 2008

(87) PCT Pub. No.: WO2007/046573

PCT Pub. Date: Apr. 26, 2007

(65) Prior Publication Data

US 2008/0257239 A1    Oct. 23, 2008

(30) Foreign Application Priority Data

Oct. 20, 2005   (KR) .................. 10-2005-0099193

(51) Int. Cl.
A01C 7/00    (2006.01)
A01C 9/00    (2006.01)

(52) U.S. Cl. ..................................... 111/186
(58) Field of Classification Search ......... 111/186–188, 111/170
See application file for complete search history.

(56) References Cited

U.S. PATENT DOCUMENTS 4,611,545 A    9/1986    Nickelson et al.
6,125,775 A    10/2000   Gust
6,527,205 B2   3/2003    Andersson et al.

FOREIGN PATENT DOCUMENTS

EP    0570792 B1    2/1997
JP    11-018514 A   1/1999
JP    17-168363 A   6/2005
KR    2005-0065293 A 6/2005

*Primary Examiner*—Christopher J. Novosad
(74) *Attorney, Agent, or Firm*—Ladas & Parry LLP

(57) ABSTRACT

The present invention relates to a direct seeder. A fertilizer receptacle and a seed receptacle integrally formed with each other in the conventional art are separated from each other. A single fertilizer receptacle and a single seed receptacle are used in place of a plurality of fertilizer receptacles and a plurality of seed receptacles according to the conventional art. The fertilizer receptacle and seed receptacle are installed to be positioned so low that fertilizer and seeds can be easily poured into the fertilizer receptacle and seed receptacle. A screw conveyor for removing the traces of tractor wheels is installed on the direct seeder.

4 Claims, 7 Drawing Sheets

[Fig. 1]
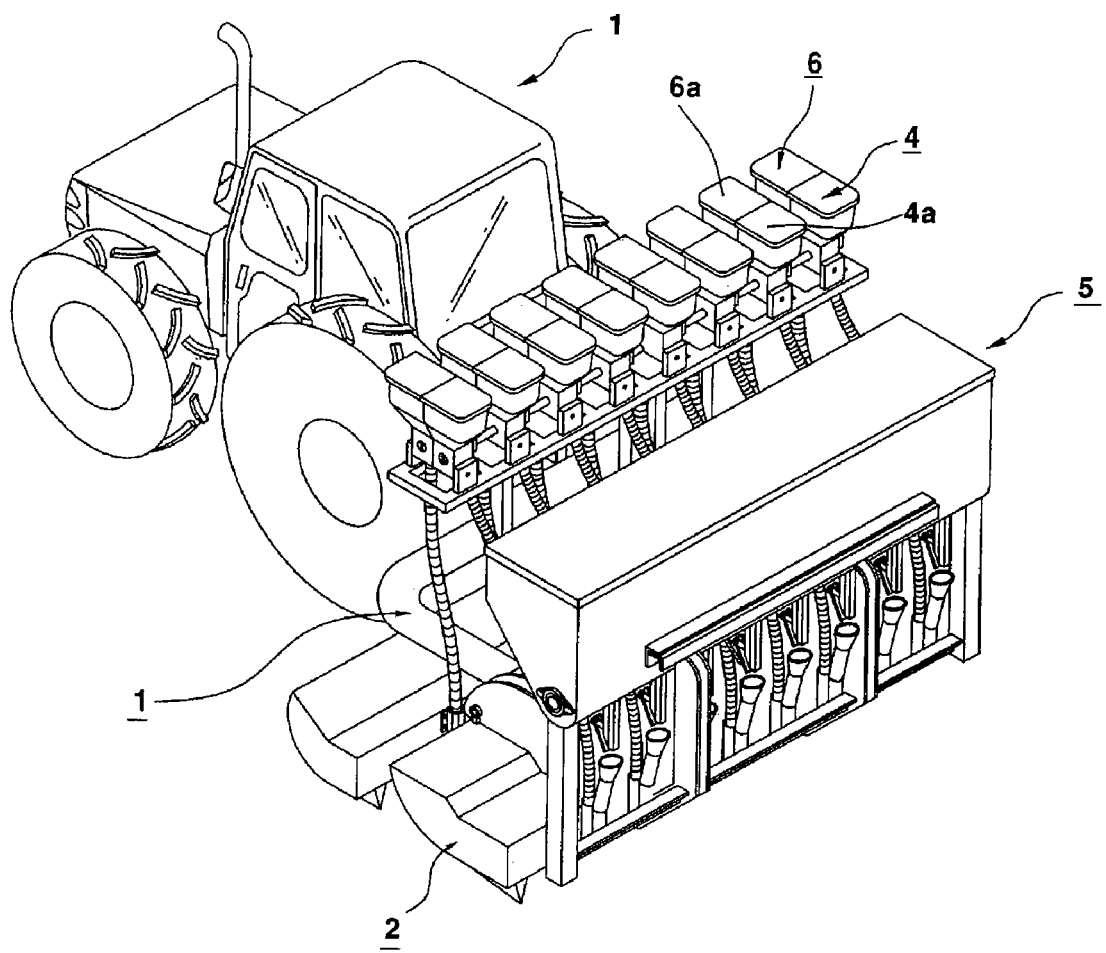

[Fig. 2]
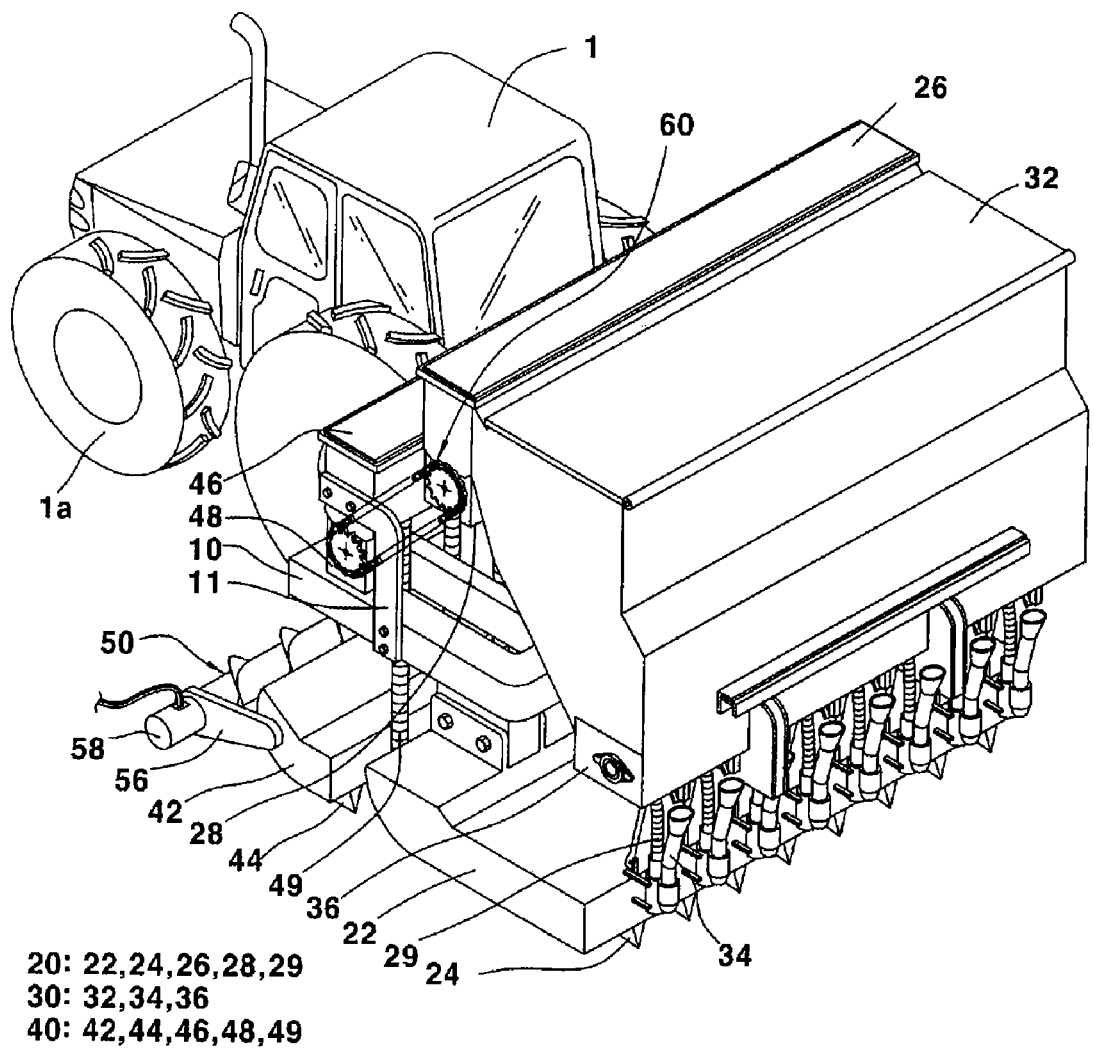
20: 22, 24, 26, 28, 29
30: 32, 34, 36
40: 42, 44, 46, 48, 49

[Fig. 3]
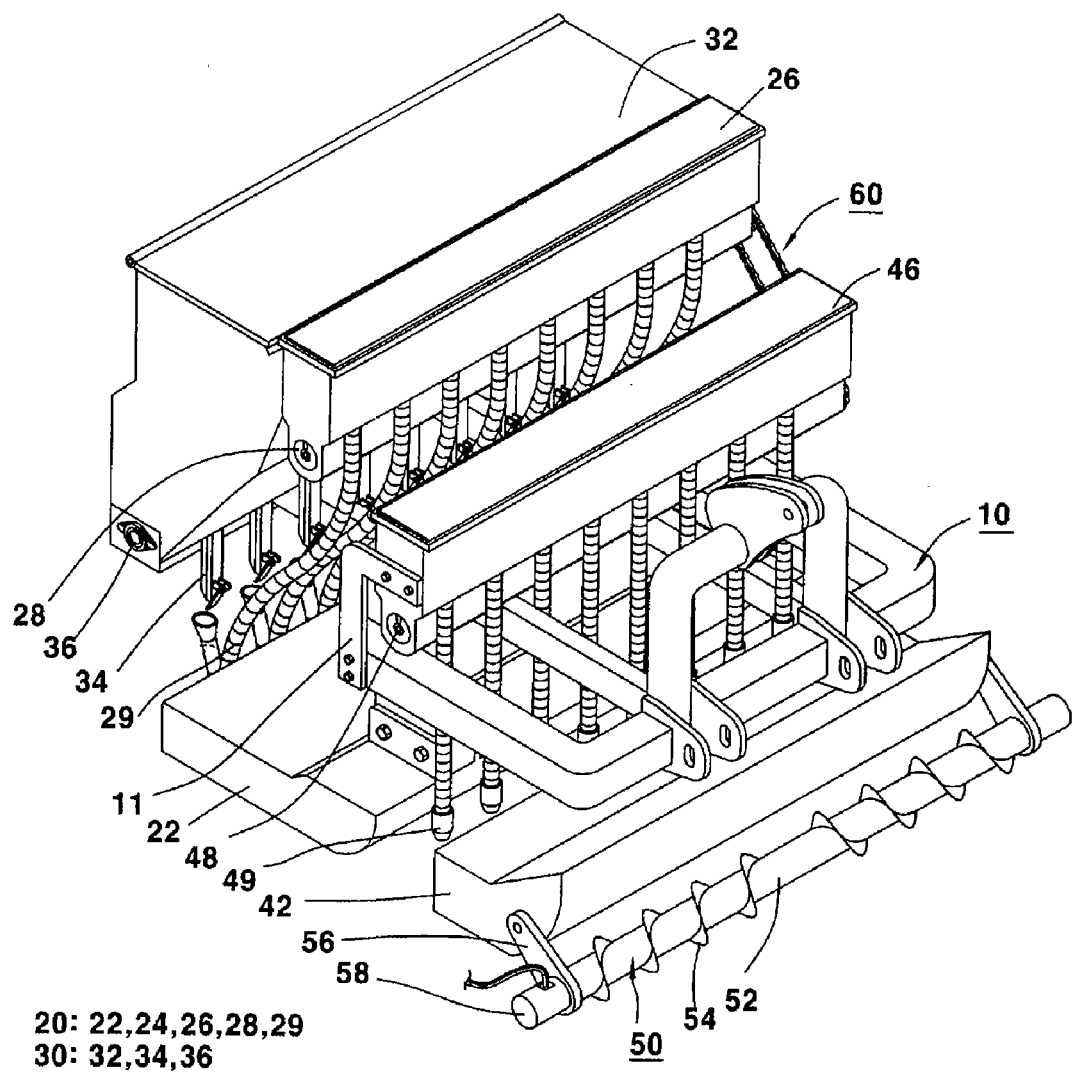
20: 22, 24, 26, 28, 29
30: 32, 34, 36
40: 42, 44, 46, 48, 49

[Fig. 4]
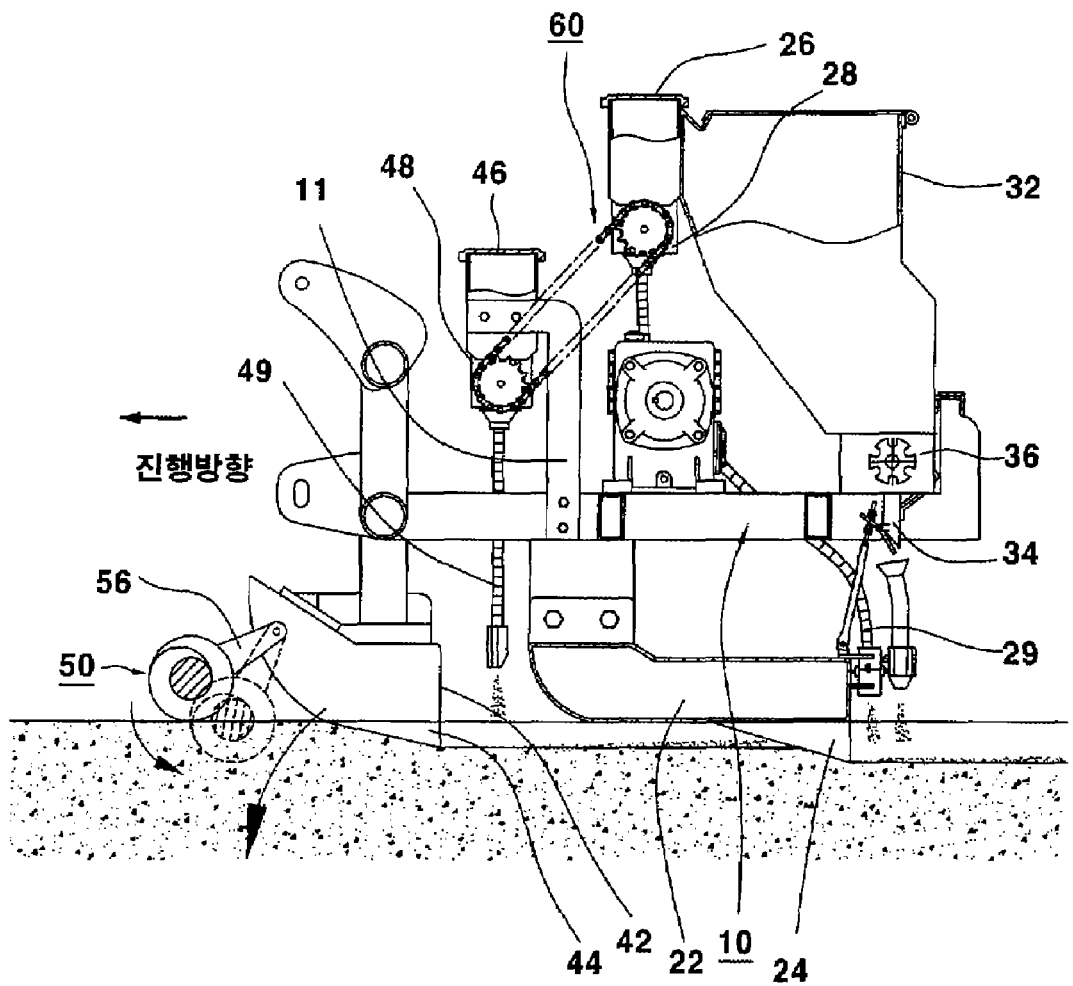

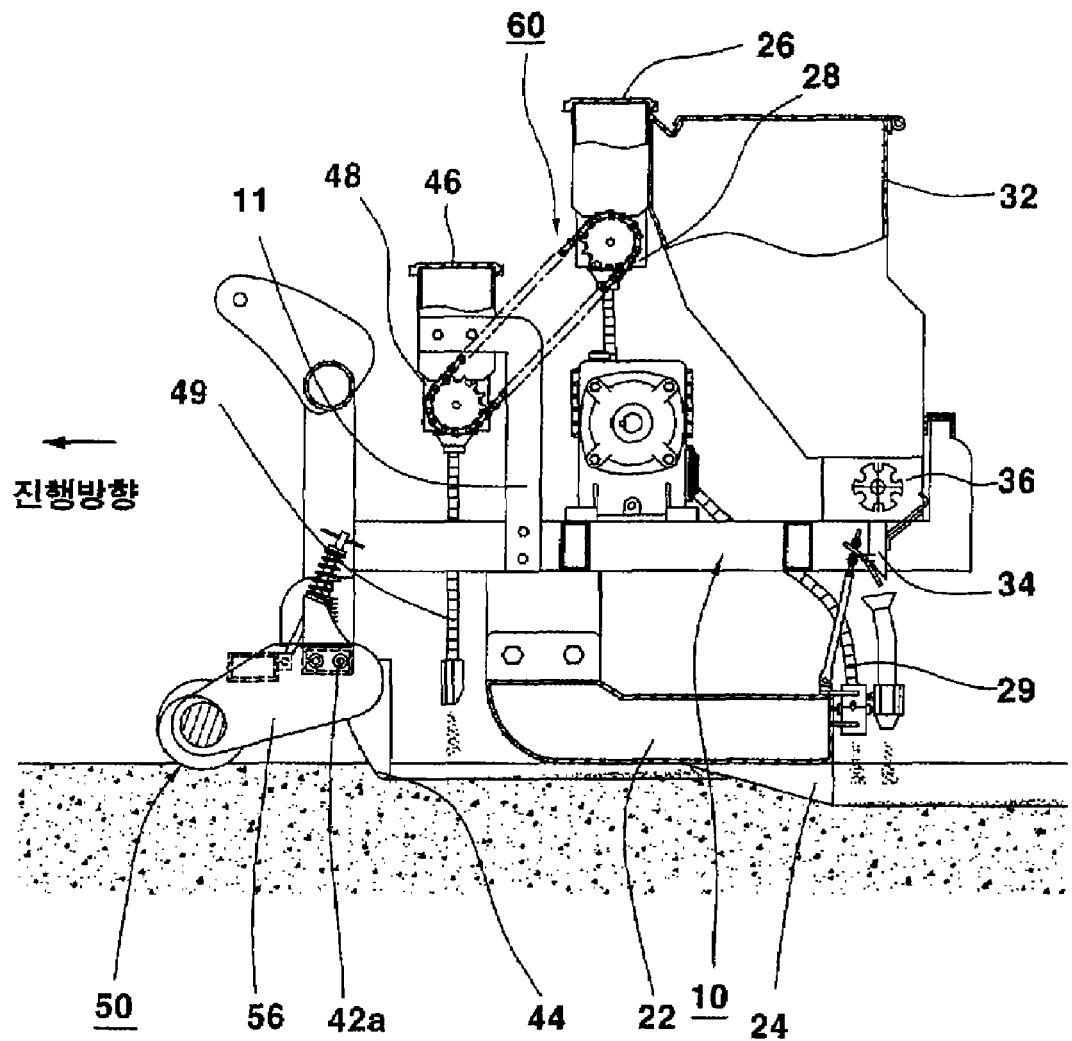
[Fig. 5]

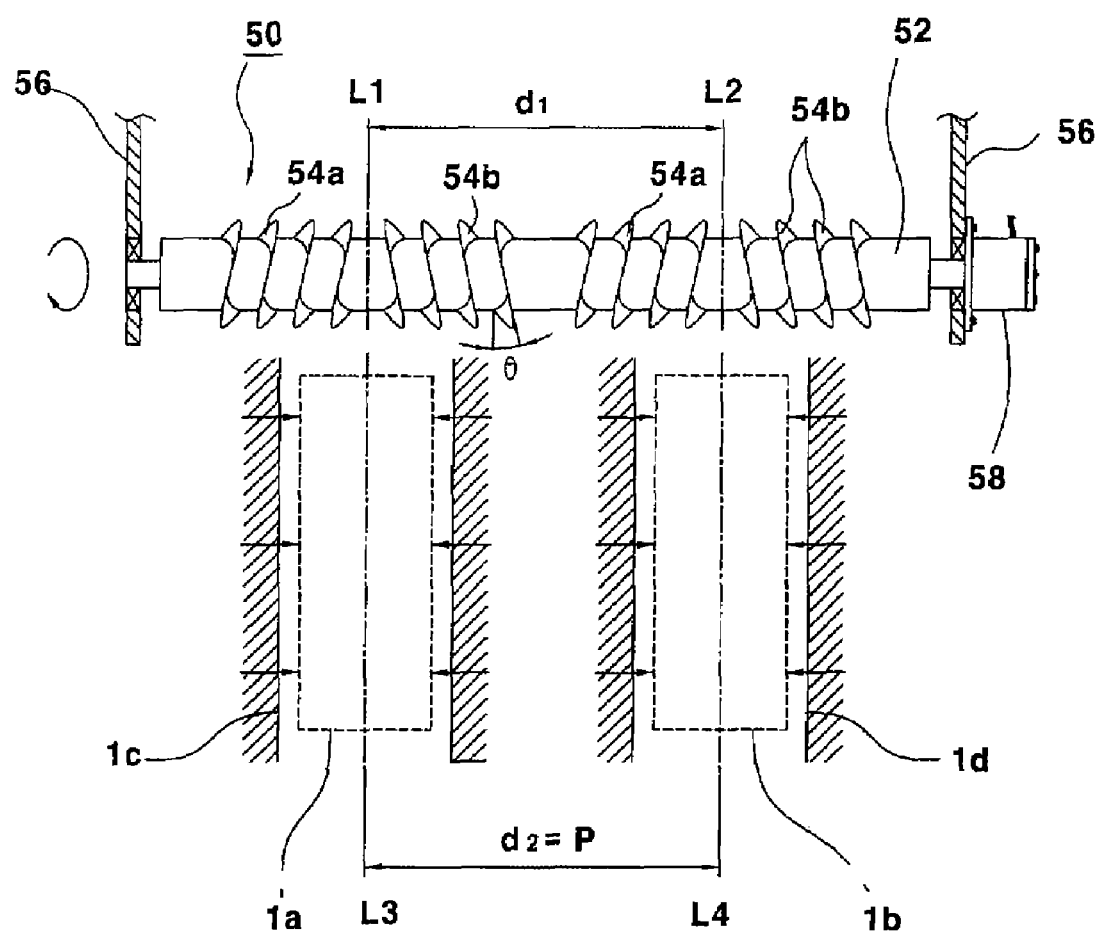
[Fig. 6]
54: 54a, 54b

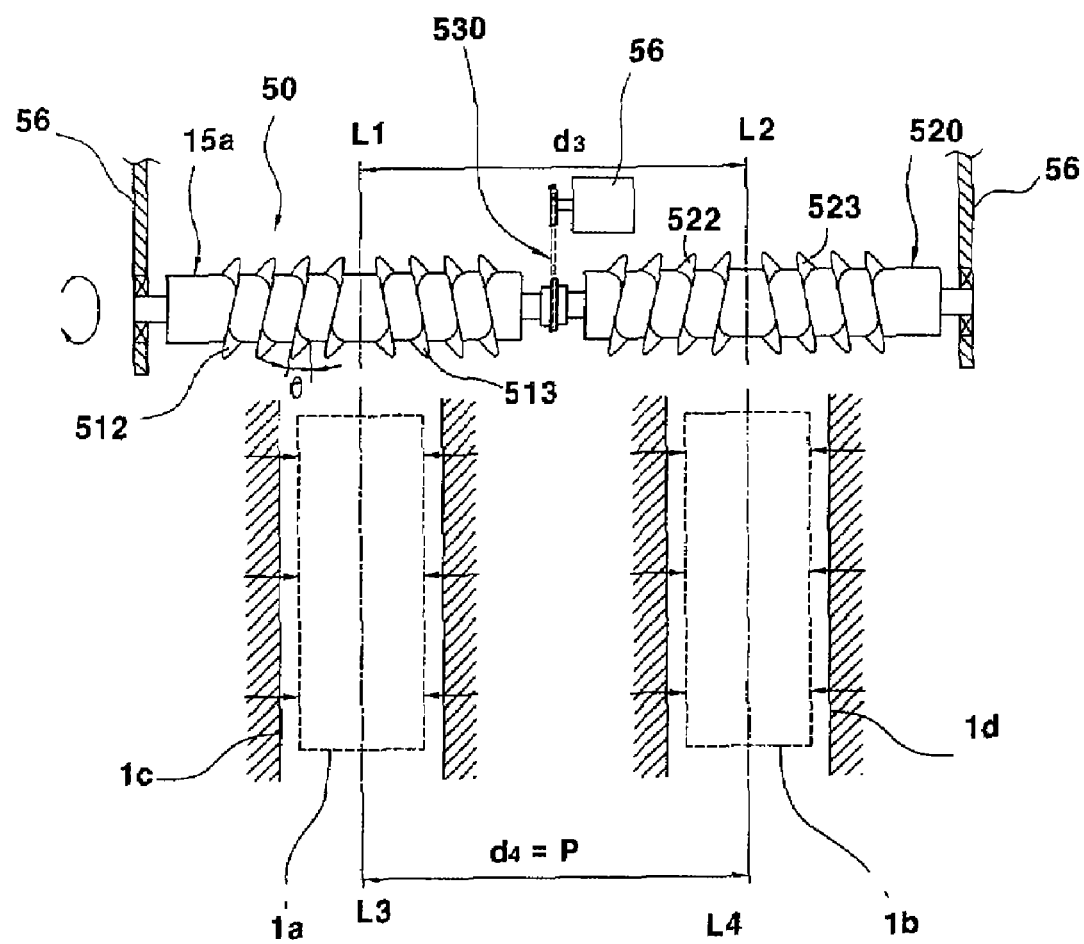

DIRECT SEEDER

TECHNICAL FIELD

The present invention relates to a direct seeder, and more particularly to a direct seeder wherein a fertilizer receptacle and a seed receptacle integrally formed with each other in the conventional art are separated from each other, a single fertilizer receptacle and a single seed receptacle are used in place of a plurality of fertilizer receptacles and a plurality of seed receptacles according to the conventional art, the fertilizer receptacle and seed receptacle are installed to be positioned so low that fertilizer and seeds can be easily poured into the fertilizer receptacle and seed receptacle, and a screw conveyor for removing the traces of tractor wheels is installed.

BACKGROUND ART

As is generally known in the art, a direct seeder is a kind of agricultural machine which is used in such a way as to be pulled by a tractor. The direct seeder is constructed such that it can perform successive operations of forming furrows in the field, sowing seeds in the furrows, and covering the sown seeds with soil.

Referring to FIG. 1, the direct seeder comprises a main frame 11, a furrow forming unit 2 for forming seed furrows in the field, a sowing unit 30 for sowing seeds in the seed furrows, a covering unit 4 for covering the sown seeds with soil, and a fertilizing unit 5 for forming fertilizer furrows and putting fertilizer in the fertilizer furrows.

In the conventional direct seeder, since fertilizer receptacles 6a and seed receptacles 4a are installed at a relatively high position, in order to replenish fertilizer or seeds in the fertilizer receptacle 6a or in the seed receptacles 4a, a worker must stands on a support, whereby cumbersomeness is caused. Also, when replenishing fertilizer or seeds in the fertilizer receptacle 6a or in the seed receptacles 4a, because the operation of the direct seeder must be interrupted, the operational efficiency of the direct seeder decreases.

Further, due to the fact that the plurality of separate fertilizer receptacle 6a and the plurality of separate seed receptacles 4a are used, when replenishing fertilizer and seeds in the fertilizer receptacle 6a and in the seed receptacles 4a, the fertilizer and seeds must be divided into appropriate amounts in consideration of the capacity of each receptacle. Therefore, a replenishing time is lengthened, and the loss rates of the fertilizer and seed are increased.

Meanwhile, considering that the direct seeder is used in such a way as to be pulled by a tractor, means for leveling off or removing the traces of tractor wheels is needed. In the conventional direct seeder, while a screw conveyor is installed at the front end of the direct seeder to level off or remove the traces of the tractor wheels, the screw conveyor of the conventional direct seeder has a structure which is different from that of the present invention.

DISCLOSURE OF INVENTION

Technical Problem

Accordingly, the present invention has been made keeping in mind the above problems occurring in the prior art, and an object of the present invention is to provide a direct seeder in which a fertilizer receptacle and a seed receptacle are separately positioned from each other, a single fertilizer receptacle and a single seed receptacle are used, and the fertilizer receptacle and seed receptacle are installed to be positioned so low that fertilizer and seeds can be easily poured into the fertilizer receptacle and seed receptacle.

Another object of the present invention is to provide a direct seeder which not only has the fertilizer receptacle and the seed receptacle but also is provided with a novel screw conveyor for removing the traces of tractor wheels.

Technical Solution

In order to achieve the above objects, according to the present invention, there is provided a direct seeder comprising:

a main frame serving as a skeleton of the direct seeder;

a sowing unit having a rear block which is coupled to the main frame to be capable of rolling and pitching and is formed on a lower surface thereof with a plurality of furrow forming projections for forming furrows for seeds in a field, a seed receptacle which is installed to be supported by a soil receptacle and receives seeds, a seed discharging device which is installed at a discharge end of the seed receptacle to allow discharge of a predetermined amount of seeds, and seed discharge pipes which guide seeds discharged through the seed discharge device into the furrows for seeds;

a covering unit having the soil receptacle which is supported by the main frame and receives soil for covering the seeds sown into the furrows, and soil discharge pipes which are connected to an exit of the soil receptacle and guide the soil discharged from the soil receptacle to cover the sown seeds; a fertilizing unit having a front block which is supported by the main frame, is positioned in front of the rear block and is formed on a lower surface thereof with a plurality of furrow forming projections for forming furrows for fertilizer in the field, a fertilizer receptacle which is supported by the main frame by way of an auxiliary frame, is positioned below the seed receptacle and receives fertilizer, a fertilizer discharging device which is installed at a discharge end of the fertilizer receptacle to allow the fertilizer to be automatically discharged out of the fertilizer receptacle upon power supply to the fertilizer discharging device, and fertilizer discharge pipes which guide the fertilizer discharged through the fertilizer discharging device into the furrows for fertilizer; and a screw conveyor installed in front of the front block to perform a function of removing traces of tractor wheels.

ADVANTAGEOUS EFFECTS

By the features of the present invention, the direct seeder according to the present invention provides advantages in that a fertilizer receptacle and a seed receptacle are separately positioned from each other, a single fertilizer receptacle and a single seed receptacle are used, and the fertilizer receptacle and seed receptacle are installed to be positioned so low that fertilizer and seeds can be easily poured into the fertilizer receptacle and seed receptacle and the loss rates of the fertilizer and seed can be decreased. Also, because it is possible to replenish fertilizer and seeds in the fertilizer receptacle and the seed receptacle while running the direct seeder, the operational efficiency of the direct seeder can be improved.

Further, as a screw conveyor removes the traces of tractor wheels, the sowing operation, the fertilizing operation, and the covering operation can be precisely performed.

BRIEF DESCRIPTION OF THE DRAWINGS

FIG. 1 is a perspective view illustrating a conventional direct seeder;

FIG. 2 is a rear perspective view illustrating a direct seeder in accordance with an embodiment of the present invention;

FIG. 3 is a front perspective view illustrating the direct seeder in accordance with the embodiment of the present invention;

FIG. 4 is a side view of the direct seeder in accordance with the embodiment of the present invention;

FIG. 5 is a side view illustrating a variation of the direct seeder in accordance with the embodiment of the present invention;

FIG. 6 is a structural view illustrating an integrated type screw conveyor; and

FIG. 7 is a structural view illustrating an exploded type screw conveyor.

DESCRIPTION OF REFERENCE NUMERALS FOR MAIN COMPONENTS OF DRAWINGS

26: seed receptacle 46: fertilizer receptacle
50: screw conveyor 60: chain and chain wheel

BEST MODE FOR CARRYING OUT THE INVENTION

Hereafter, a preferred embodiment of the present invention will be described in detail with reference to the attached drawings.

FIG. 2 is a rear perspective view illustrating a direct seeder in accordance with an embodiment of the present invention, FIG. 3 is a front perspective view illustrating the direct seeder in accordance with the embodiment of the present invention, FIG. 4 is a side view of the direct seeder in accordance with the embodiment of the present invention, FIG. 5 is a side view illustrating a variation of the direct seeder in accordance with the embodiment of the present invention, FIG. 6 is a structural view illustrating an integrated type screw conveyor, and FIG. 7 is a structural view illustrating an exploded type screw conveyor.

Referring to the drawings, a direct seeder in accordance with an embodiment of the present invention largely comprises a main frame 10 serving as the skeleton of the direct seeder, a sowing unit 20 for automatically performing successive operations of forming furrows for seeds in a field and of sowing seeds in the furrows for seeds, a covering unit 30 for automatically performing an operation of covering the sown seeds with soil, a fertilizing unit 40 for automatically performing successive operations of forming furrows for fertilizer in the field adjacent to the furrows for seeds and of sprinkling fertilizer into the furrows for fertilizer, and a screw conveyor 50 installed at the front end of the direct seeder to level off or remove the traces of the wheels of a tractor 1.

The structural features of the respective units will be explained below.

First, the sowing unit 20 includes a rear block 22 which is coupled to the main frame 10 to be capable of rolling and pitching, a plurality of furrow forming projections 24 which are formed and arranged transversely on the lower surface of the rear block 22 to form a plurality of rows of furrows for seeds in the field, a seed receptacle 26 which is installed to be supported by a soil receptacle 32 described later in detail and receives seeds, a seed discharging device 28 which is installed at the discharge side of the seed receptacle 26 to allow a predetermined amount of seeds to be discharged, and seed discharge pipes 29 which guide the seeds discharged through the seed discharge device 28 into the furrows for seeds.

The seed receptacle 26 has a length which is substantially similar to the width of the direct seeder and comprises a single receptacle body.

Next, the covering unit 30 includes the soil receptacle 32 which is supported by the rear part of the main frame 10 and receives soil for covering the seeds sown into the furrows, and soil discharge pipes 34 which are connected to the exit of the soil receptacle 32 and guide the soil discharged from the soil receptacle 32 to cover the sown seeds. At this time, it is preferred that a soil discharging device 36 be installed at the discharge side of the soil receptacle 32 to allow a predetermined amount of soil to be discharged.

The fertilizing unit 40 includes a front block 42 which is supported by the main frame 10 to be positioned in front of the rear block 22, a plurality of furrow forming projections 44 which are formed and arranged transversely on the lower surface of the front block 42 to form a plurality of rows of furrows for fertilizer in the field, a fertilizer receptacle 46 which is supported by the main frame 10 by way of an auxiliary frame 11 to be positioned below the seed receptacle 26 and receives fertilizer, a fertilizer discharging device 48 which is installed at the discharge side of the fertilizer receptacle 46 to allow a predetermined amount of fertilizer to be discharged, and fertilizer discharge pipes 49 which guide the fertilizer discharged through the fertilizer discharging device 48 into the furrows for fertilizer.

The fertilizer receptacle 46 has a length which is substantially similar to the width of the direct seeder and comprises a single receptacle body. The seed discharging device 28 and the fertilizer discharging device 48 are connected with each other by a chain and chain wheels 60 to be operated in an interlocked manner. The chain and chain wheels 60 are driven by driving means (not shown) which is turned on when the direct seeder is started to run.

A transverse bar 42a which has a slim configuration can be used in place of the front block 42.

The screw conveyor 50 includes a transverse column 52 which has a length substantially similar to the transverse length of the front block 42, and screw blades 54 which are formed on the circumferential outer surface of the transverse column 52.

The screw conveyor 50 is hingedly coupled to the front block 42 by way of brackets 56 to be moved upwards and downwards.

The screw conveyor 50 can be rotated by a driving motor 58 which is fixedly installed on one of the brackets 56.

The screw conveyor 50 can be an integrated type or a split type.

In the case of the integrated type screw conveyor 50, as can be readily seen from FIG. 6, both ends of the integrated type screw conveyor 50 are rotatably mounted to and supported by the brackets 56 which are installed on both sides of the front block 42. The driving motor 58 is installed on one of the brackets 56 and is connected with an end of the screw conveyor 50.

In the integrated type screw conveyor 50, when forming the screw blades 54, the following principle must be observed. That is to say, two pairs of screw blades 54 are respectively formed on the left portion and the right portion of the transverse column 52 when viewed from the lengthwise middle of the transverse column 52. The respective pairs of screw blades 54a and 54b are formed on the transverse column 52 at both sides of symmetrical center lines $L_1$ and $L_2$ in a manner such that the respective pairs of screw blades 54a and 54b are symmetrical to each other on the symmetrical center lines $L_1$ and $L_2$ and downwardly diverge to define an angle $\theta$.

The distance $d_1$ measured from the symmetrical center line $L_1$ between the left pair of screw blades 54a and 54b to the symmetrical center line $L_2$ between the right pair of screw blades 54a and 54b is substantially similar or greater than the pitch P of the left and right wheels 1a and 1b of the tractor 1. The pitch P is defined as the distance $d_2$ between the widthwise center $L_3$ of the left wheel 1a and the widthwise center $L_4$ of the right wheel 1b.

In the case of the split type screw conveyor 50, as can be readily seen from FIG. 7, a first screw conveyor 510 and a second screw conveyor 520 are connected with each other to be arranged in line between the brackets 56 which are installed on both sides of the front block 42. The driving motor 58 is placed between the first and second screw conveyors 510 and 520 and is simultaneously connected with both of the first and second screw conveyors 510 and 520 by way of power transmission means such as a chain and chain wheels 530.

In the split type screw conveyor 50, when forming screw blades 512, 513, 522 and 523, the following principle must be observed. That is to say, two pairs of screw blades 512, 513, 522 and 523 are respectively formed on the transverse columns 511 and 521 of the first and second screw conveyors 510 and 520. The respective pairs of screw blades 512, 513, 522 and 523 are formed on the transverse columns 511 and 521 in a manner such that the respective pairs of screw blades 512, 513, 522 and 523 are symmetrical to each other on symmetrical center lines $L_1$ and $L_2$ and downwardly diverge to define an angle θ.

The distance $d_3$ measured from the symmetrical center line $L_1$ between the left pair of screw blades 512 and 513 formed on the first screw conveyor 510 to the symmetrical center line $L_2$ between the right pair of screw blades 522 and 523 formed on the second screw conveyor 520 is substantially similar or greater than the pitch P of the left and right wheels 1a and 1b of the tractor 1. The pitch P is defined as the distance $d_4$ between the widthwise center $L_3$ of the left wheel 1a and the widthwise center $L_4$ of the right wheel 1b.

Hereinbelow, the operational procedure of the direct seeder according to the present invention, constructed as mentioned above, will be described.

The direct seeder according to the present invention is used in such a way as to be pulled by the tractor 1. The direct seeder performs the successive operations of forming furrows for seeds in the field, sowing seeds in the furrows for seeds, forming furrows for fertilizer in the field adjacent to the furrows for seeds, sprinkling fertilizer into the furrows for fertilizer, and covering the sown seeds with soil.

In this procedure, as the screw conveyor 50 which is positioned at the front end of the direct seeder rotates and passes over the field which is pressed and dug out by the wide type left and right wheels 1a and 1b of the tractor 1, due to the inclined formation of the screw blades 54 which is provided on the circumferential outer surface of the transverse column 52, the earth which is pressed and dug out by the wheels 1a and 1b can be restored into its original state and can be conveyed inward toward the center line of each wheel to level off the field.

Concretely speaking, each pair of left and right screw blades 54a and 54b of the screw conveyor 50 has a structure which is symmetrical with respect to the symmetrical center lines $L_1$ and $L_2$ and downwardly diverges, and the distance between the two symmetrical center lines $L_1$ and $L_2$ is similar to or greater than the pitch P of the wheels 1a and 1b which is defined as the distance $d_2$ between the widthwise centers of the left and right wheels 1a and 1b of the tractor 1. Therefore, when the screw conveyor 50 is rotated in the direction indicated by the arrow in FIG. 6, the earth dug out outward of the wheel traces 1c and 1d can be collected again inward of the wheel traces 1c and 1d by the respective pair of left and right screw blades.

Since the screw conveyor 50 is hingedly coupled with respect to the front block 42, the screw conveyor 50 can be freely moved upwards and downwards. Accordingly, the screw conveyor 50 can remove the wheel traces while being freely moved in conformity with the contour of the field. Due to this free movement of the screw conveyor 50, even when the field has a severely indented contour, the screw conveyor can reliably perform its function, and as a result, load produced in the course of operating the direct seeder can be remarkably decreased.

From now on, the sowing, fertilizing and covering operations of the direct seeder will be schematically explained.

As described above, as the traces of the tractor wheels are removed by the screw conveyor 50, the field remains leveled off. Hence, a condition for adequately performing the sowing and fertilizing operations is satisfied.

In this state, as the front block 42 and the rear block 22 are moved while being brought into contact with the surface of the ground, a plurality of furrows for fertilizer are formed in the field along the moving direction of the direct seeder by the plurality of furrow forming projections 44 which are formed on the lower surface of the front block 42. At the same time, a plurality of furrows for seeds are formed in the field along the moving direction of the direct seeder by the plurality of furrow forming projections 24 which are formed on the lower surface of the rear block 22.

Then, as the seed discharging device 28 and the fertilizer discharging device 48 are operated by the chain and chain wheels 60, the seeds and fertilizer received in the seed receptacle 26 and the fertilizer receptacle 46 are discharged through the seed discharge pipes 29 and the fertilizer discharge pipes 49 by the predetermined amounts.

The fertilizer and seeds discharged through the fertilizer discharge pipes 49 and the seed discharge pipes 29 are respectively sprinkled and sown into the furrows for fertilizer and the furrows for seeds which are formed by the furrow forming projections 24 and 44. In particular, because seed covering material (a mixture of silicate fertilizer and soil) which is discharged through the soil discharge pipes 34 covers the seeds sown into the furrows for seeds, it is possible to prevent the seeds from being lost by wind or birds.

If the seeds in the seed receptacle 26 and the fertilizer in the fertilizer receptacle 46 are exhausted while performing the direct seeding operations, they must be replenished. At this time, when compared to the conventional art, since the fertilizer receptacle 46 and the seed receptacle 26 are positioned so low that a worker can directly pour the seeds and fertilizer into the seed receptacle 26 and the fertilizer receptacle 46 without using a separate step board, the replenishing operation can be conducted without the need of interrupting the operation of the direct seeder. As a consequence, it is possible to shorten a seeding time and convenience is ensured.

Also, because each of the seed receptacle 26 and the fertilizer receptacle 46 comprises a single receptacle body, the seeds and fertilizer can be poured into the receptacles at a time, whereby convenience is ensured when replenishing the seeds and fertilizer.

INDUSTRIAL APPLICABILITY

As is apparent from the above descriptions, the direct seeder according to the present invention provides advantages in that a fertilizer receptacle and a seed receptacle are separately positioned from each other, a single fertilizer receptacle and a single seed receptacle are used, and the fertilizer receptacle and seed receptacle are installed to be positioned so low that fertilizer and seeds can be easily poured into the fertilizer receptacle and seed receptacle and the loss rates of the fertilizer and seed can be decreased. Also, because it is possible to replenish fertilizer and seeds in the fertilizer receptacle and the seed receptacle while running the direct seeder, the operational efficiency of the direct seeder can be improved.

Further, as a screw conveyor removes the traces of tractor wheels, the sowing operation, the fertilizing operation, and the covering operation can be precisely performed.

The invention claimed is:

1. A direct seeder comprising:
   a main frame (10) serving as a skeleton of the direct seeder;
   a sowing unit (20) having a rear block (22) which is coupled to the main frame (10) to be capable of rolling and pitching and is formed on a lower surface thereof with a plurality of furrow forming projections (24) for forming furrows for seeds in a field, a plurality of seed receptacles (26) which are installed to be supported by a soil receptacle (32) and receives seeds, a seed discharging device (28) which is installed at a discharge end of the seed receptacle (26) to allow discharge of a predetermined amount of seeds, and seed discharge pipes (29) which guide seeds discharged through the seed discharge device (28) into the furrows for seeds;
   a covering unit (30) having the soil receptacle (32) which is supported by the main frame (10) and receives soil for covering the seeds sown into the furrows, and soil discharge pipes (34) which are connected to an exit of the soil receptacle (32) and guide the soil discharged from the soil receptacle (32) to cover the sown seeds;
   a fertilizing unit (40) having a front block (42) which is supported by the main frame (10), is positioned in front of the rear block (22) and is formed on a lower surface thereof with a plurality of furrow forming projections (44) for forming furrows for fertilizer in the field, a plurality of fertilizer receptacles (46) which are supported by the main frame (10) by way of an auxiliary frame (11), is positioned below the seed receptacle (26) and receives fertilizer, a fertilizer discharging device (48) which is installed at a discharge end of the fertilizer receptacle (46) to allow the fertilizer to be automatically discharged out of the fertilizer receptacle (46) upon power supply to the fertilizer discharging device (48), and fertilizer discharge pipes (49) which guide the fertilizer discharged through the fertilizer discharging device (48) into the furrows for fertilizer; and
   a screw conveyor (50) installed in front of the front block (42),
   wherein the screw conveyer (50) includes two pairs of screw blades 54 which are respectively formed on a left portion and a right portion of the transverse column 52 when viewed from a lengthwise middle of the transverse column 52 such that earth, which is dug out outward of wheel traces 1c and 1d, is collected inward of the wheel traces 1c and 1d, respective pairs of screw blades 54a and 54b are symmetrical to each other about symmetrical center lines L1 and L2 and downwardly diverge to define an angle (θ), and a distance d1 measured from the symmetrical center line L1 between the left pair of screw blades 54a and 54b to the symmetrical center line L2 between the right pair of screw blades 54a and 54b is substantially similar to or greater than a pitch P of the left and right wheels 1a and 1b of the tractor 1,
   and wherein the seed receptacles (26) and the fertilizer receptacles (46) are prepared in a form of a single receptacle, respectively.

2. The direct seeder as set forth in claim 1, wherein the seed receptacle (26) is integrated with the soil receptacle (32).

3. The direct seeder as set forth in claim 1, wherein the seed discharging device (28) and the fertilizer discharging device (48) are operationally connected with each other by a chain and chain wheels (60).

4. A direct seeder comprising:
   a main frame (10) serving as a skeleton of the direct seeder;
   a sowing unit (20) having a rear block (22) which is coupled to the main frame (10) to be capable of rolling and pitching and is formed on a lower surface thereof with a plurality of furrow forming projections (24) for forming furrows for seeds in a field, a plurality of seed receptacles (26) which are installed to be supported by a soil receptacle (32) and receives seeds, a seed discharging device (28) which is installed at a discharge end of the seed receptacle (26) to allow discharge of a predetermined amount of seeds, and seed discharge pipes (29) which guide seeds discharged through the seed discharge device (28) into the furrows for seeds;
   a covering unit (30) having the soil receptacle (32) which is supported by the main frame (10) and receives soil for covering the seeds sown into the furrows, and soil discharge pipes (34) which are connected to an exit of the soil receptacle (32) and guide the soil discharged from the soil receptacle (32) to cover the sown seeds;
   a fertilizing unit (40) having a front transverse bar (42a) which is supported by the main frame (10), is positioned in front of the rear block (22) and is formed on a lower surface thereof with a plurality of furrow forming projections (44) for forming furrows for fertilizer in the field, a plurality of fertilizer receptacles (46) which are supported by the main frame (10) by way of an auxiliary frame (11), is positioned below the seed receptacle (26) and receives fertilizer, a fertilizer discharging device (48) which is installed at a discharge end of the fertilizer receptacle (46) to allow the fertilizer to be automatically discharged out of the fertilizer receptacle (46) upon power supply to the fertilizer discharging device (48), and fertilizer discharge pipes (49) which guide the fertilizer discharged through the fertilizer discharging device (48) into the furrows for fertilizer; and
   a screw conveyor (50) installed in front of the front transverse bar (42a),
   wherein the screw conveyer (50) includes two pairs of screw blades 54 which are respectively formed on a left portion and a right portion of the transverse column 52 when viewed from a lengthwise middle of the transverse column 52 such that earth, which is dug out outward of wheel traces 1c and 1d, is collected inward of the wheel traces 1c and 1d, respective pairs of screw blades 54a and 54b are symmetrical to each other about symmetrical center lines L1 and L2 and downwardly diverge to define an angle (θ), and a distance d1 measured from the symmetrical center line L1 between the left pair of screw blades 54a and 54b to the symmetrical center line L2 between the right pair of screw blades 54a and 54b is substantially similar to or greater than a pitch P of the left and right wheels 1a and 1b of the tractor 1,
   and wherein the seed receptacles (26) and the fertilizer receptacles (46) are prepared in a form of a single receptacle, respectively.

* * * * *

UNITED STATES PATENT AND TRADEMARK OFFICE
CERTIFICATE OF CORRECTION

PATENT NO.       : 7,603,956 B2  Page 1 of 1
APPLICATION NO.  : 12/067435
DATED            : October 20, 2009
INVENTOR(S)      : Noh et al.

It is certified that error appears in the above-identified patent and that said Letters Patent is hereby corrected as shown below:

On the Title Page, Column 1, Section (73):

The only Assignee that should be listed is

KOREA: RURAL DEVELOPMENT ADMINISTRATION, Gyeonggi-do, Republic of Korea

Signed and Sealed this

Twenty-second Day of December, 2009

David J. Kappos
*Director of the United States Patent and Trademark Office*